US007660405B2

(12) United States Patent
Jain et al.

(10) Patent No.: US 7,660,405 B2
(45) Date of Patent: Feb. 9, 2010

(54) SYSTEM AND METHOD FOR EMPLOYING STATE INFORMATION TO ENHANCE NETWORK FUNCTIONALITY

(75) Inventors: Mukul Jain, San Jose, CA (US); Shmuel Shaffer, Palo Alto, CA (US); Denise Caballero-Mccann, Raleigh, NC (US); Labhesh Patel, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 458 days.

(21) Appl. No.: 11/378,602

(22) Filed: Mar. 17, 2006

(65) Prior Publication Data

US 2007/0263814 A1 Nov. 15, 2007

(51) Int. Cl.
*H04M 3/42* (2006.01)
*H04L 12/66* (2006.01)

(52) U.S. Cl. .......................... 379/209.01; 379/201.01; 370/352

(58) Field of Classification Search ............ 379/209.01, 379/201.01, 372, 210.01, 215.01; 370/352
See application file for complete search history.

(56) References Cited

U.S. PATENT DOCUMENTS 4,809,321 A * 2/1989 Morganstein et al. .. 379/209.01
4,935,958 A * 6/1990 Morganstein et al. ....... 379/372
5,577,111 A * 11/1996 Iida et al. ................ 379/209.01
6,501,750 B1 * 12/2002 Shaffer et al. ................ 370/352
2006/0093116 A1 * 5/2006 Baird ...................... 379/209.01
2006/0193456 A1 * 8/2006 Light et al. ............. 379/201.01

FOREIGN PATENT DOCUMENTS

EP 0963093 12/1999

* cited by examiner

*Primary Examiner*—Thjuan K Addy
(74) *Attorney, Agent, or Firm*—Trellis IP Law Group, PC

(57) ABSTRACT

A system and method for enabling an enhanced camp-on feature for a communications device. In an illustrative embodiment, the system includes a first mechanism for providing information pertaining to why a first user of a first communications device is unable to be contacted. A second mechanism enables a second user of a second communications device to make a camp-on selection based on the information. In a more specific embodiment, the information includes state information pertaining to the first communications device. The first means includes a first module running on the first communications device. The first module is adapted to selectively relay the state information to an entity connected to the network. In the specific embodiment, the entity connected to the network includes Private Branch eXchange (PBX) system.

30 Claims, 4 Drawing Sheets

SYSTEM AND METHOD FOR EMPLOYING STATE INFORMATION TO ENHANCE NETWORK FUNCTIONALITY

BACKGROUND OF THE INVENTION

This invention is related in general to telecommunications and more specifically to systems and methods for handling a failed attempt to establish a phone call.

Systems for enhancing communications functionality are employed in various applications including telephone, email, instant messaging, text messaging, and multimedia messaging applications. Such applications often require functionality that provide users various communications options that may improve communications efficiency and versatility.

Functionality and features that enhance communications options are particularly important in proliferating telecommunications applications, such as Voice-Over-Internet-Protocol (VOIP) and cellular applications. An exemplary VOIP application may involve transferring messages, such as voice messages, over a packet switched network between a VOIP phone and another VOIP phone, a cellular phone, a phone connected to a circuit-switched network, such as the Public Switched Telephone Network (PSTN), a pager, and/or another communication device. Conventionally, VOIP phones and associated networks may enable certain calling features, including call forwarding, three-way calling, caller-identification (caller ID), and automatic busy-number call back (camp-on), and so on. Unfortunately, existing telephony applications often provide relatively limited feature sets that do not fully leverage existing communications infrastructure, reducing communications options, functionality, and efficiency.

DETAILED DESCRIPTION OF EMBODIMENTS OF THE INVENTION

A preferred embodiment of the present invention implements a system for enabling an enhanced camp-on feature for a communications device that is connected to a network. In an illustrative embodiment, the system includes a first mechanism that provides information pertaining to why a user ("callee") of a first communications device is unable to be contacted. A second mechanism enables a user ("caller") of a second communications device to make a camp-on selection based on the information. Selections can be made automatically according to predetermined rules.

In a more specific embodiment, the information includes state information pertaining to the first communications device. The first mechanism includes a first module, which runs on the first communications device, and selectively relays the state information to a centralized entity, such as a Private Branch exchange (PBX) system that is connected to the network.

For clarity, various well-known components, such as, power supplies, communications ports, routers, modems, firewalls, network cards, Internet Service Providers (ISPs), browsers, Base station Transceiver Subsystems (BTSs) and so on, have been omitted from the figures. However, those skilled in the art with access to the present teachings will know which components to implement and how to implement them to meet the needs of a given application.

Figure 1:
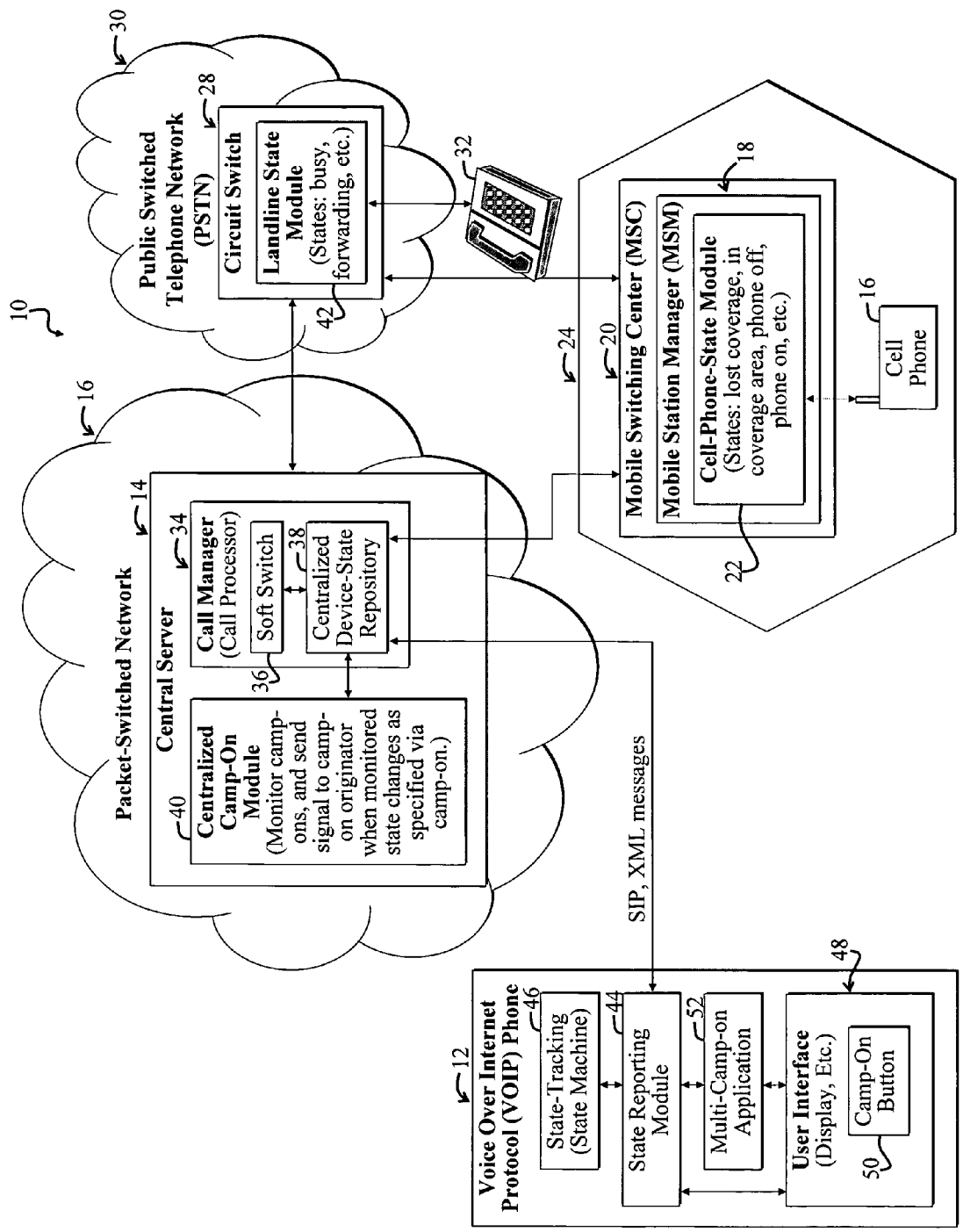
FIG. 1 is a diagram illustrating a system for enhancing functionality of a communications device according to an embodiment of the present invention that is employed in a Voice-Over-Internet-Protocol (VOIP) application.

FIG. 1 is a diagram illustrating a system 10 for enhancing functionality of a communications device according to an embodiment of the present invention employed in a Voice-Over-Internet-Protocol (VOIP) application. The system 10 may represent a network with enhanced functionality, such as enhanced camp-on functionality.

The system 10 includes a first VOIP phone 12 in communication with a central server 14 in a packet-switched network 16, such as the Internet. A cell phone 16 communicates with a Mobile Switching Center (MSC) 20 in a cellular network 24. The MSC 20 includes a Mobile Station Manager (MSM) 18 that maintains cell-phone state information in a cell-phone-state module 22. The cell-phone state information represents available state information pertaining to cell phones, including the cell phone 16, which are connected to the cellular network 24.

For illustrative purposes, the MSC 20 is shown communicating with the central server 14 in the packet-switched network 16 and a circuit switch 28 in a Public Switched Telephone Network (PSTN), which may be a circuit-switched network. A landline phone 32, also called a wired phone, is connected to the circuit switch 28.

In the present specific embodiment, the central server 14 includes a call manager 34. The call manager 34 includes a soft switch 36 in communication with a centralized device-state repository 38. The centralized device-state repository 38 communicates with a central camp-on module 40. The centralized device-state repository 38 further communicates with the cell-phone-state module 22 of the MSC 20, a landline-phone state module 42 included in the central switch 28, a VOIP phone state-reporting module 44 included in the VOIP phone 12.

The VOIP phone 12 further includes a state-tracking module 46, also called a phone state machine, which communicated with the state-reporting module 44. The VOIP phone 12 further includes a multi-camp-on module 52 that communicates with the state-reporting module and a VOIP-phone user interface 48. The user interface 48 also communicates with the state-reporting module 44. For illustrative purposes, the user interface 48 is shown including a camp-on button 50.

For the purposes of the present discussion, a callee communications device may be any communications device that is a recipient or an intended recipient of a message or other communication intended to initiate a call. A call may be any communication session between two or more network entities. Similarly, a caller communications device may be any communications device that is employed to initially send a communication to a callee device to initiate a call.

A communications device may be any entity, including software and/or hardware, that may be employed to facilitate establishing a communications session via a network. A network may be any collection of connected or coupled devices or entities. A network entity may be any thing that is connected to or incorporated within a network, including software, hardware, protocols, stored data, and so on. Hence, a network communications device may be implemented in software without departing from the scope of the present discussion. A phone may be any communications device.

Camp-functionality may be or may include any feature or functionality associated with a camp-on decision. Similarly, a camp-on feature may be any functionality or feature associated with a camp-on decision. A camp-on selection or decision can include any means for determining a user's decision or choice of how to handle the inability to establish or maintain a communications session.

A communication action, also a communications action, may be any task implemented or initiated via an entity, including hardware or software, connected to the network. Examples of communications actions include initiating phone calls, sending Short Message Service (SMS) text message, initiating an Instant Messaging (IM) session, sending an electronic mail message, and so on.

A protocol may be any set of instructions or corresponding method that can be used to facilitate communications between one or more entities, such as hardware and/or software modules, devices, or networks. Hence, instructions contained in a particular software module or a network communications device may comprise a protocol.

State information may be any information about a given entity, such as a network device or user employing the network device. Examples of state information include information indicating that a user is in a conference or is out of town, information indicating that a communications device is busy with another communications session, the communications device is set to Do Not Disturb (DND), the communications device is set to call forwarding, and so on.

In operation, various state-tracking modules 22, 42, 44 are adapted to selectively propagate state information pertaining associated devices 16, 32, 12 to the centralized device-state repository 38. This propagation of state information may be propagated in response to one or more queries from the centralized device-state repository 38 or automatically, or via another mechanism without departing from the scope of the present invention. The state information may include information pertaining to whether a given device is in communication with a network; whether the device is on or off, whether calls or other communications associated with the device are being forwarded; whether the device is currently participating in another call; and so on, as discussed more fully below.

Various devices, such as the VOIP phone 12 may selectively access state information pertaining to a desired device and/or device user, which is maintained in the centralized device-state repository 38. The state information may then be employed by one or more of the devices 12, 16, 32 to implement one or more rules pertaining to a desired action to be implemented in response to predetermined change in the state information.

In a first operative scenario, a user employs the user interface 48 of the VOIP phone 12 to call the cell phone 16 and the landline phone 32. In response to the initiation of the call, state information pertaining to the cell phone 16 is automatically propagated from the centralized device-state repository 38 to the state-reporting module 44 of the VOIP phone 12. Alternatively, a user employs the user interface 48 to configure the state-reporting module 44 to periodically query desired devices 16, 32 for state information. The addresses and/or phone numbers of the desire devices 16, 32 are used by the state-reporting module 44 to retrieve the corresponding state information from the centralized device-state repository 38.

In the present scenario, the cell phone 16 is in an off state. The state of the cell phone 16 is tracked by the cell-phone-state module 22 in the MSC 20 and relayed to the centralized device-state repository 38 and to the state-reporting module 44 of the VOIP phone 12. Note that the cell phone 16 may be in another state, such as on, outside a coverage area, inside a coverage area, set to forward calls, and so on. Since the cell phone is off 16, the user of the VOIP phone 12 then employs the user interface 48 and the multi-camp-on module 52 to establish a camp-on on the state of the cell phone 16.

Corresponding camp-on information, such as the phone number of the cell phone 16, the current state of the cell phone 16, and rules instructing the VOIP phone 12 to perform a certain action in response to a certain change in the current state of the cell phone 16 may be maintained in the multi-camp-on module 52. For example, the user may specify that the VOIP phone 12 automatically initiate a call back to the cell phone 16 when the cell phone 16 is turned on and is within a coverage area of the MSC 20. When the camp-on is established, the multi-camp-on module 52 periodically or continuously monitors the state of the cell phone 16 via the state-reporting module 44, which periodically or continuously retrieves appropriate state information about the cell phone 16 from the centralized device-state repository 38.

With knowledge of the current state information pertaining to the cell phone 16, the multi-camp-on module 52 may initiate a call back by the VOIP phone 12 to the cell phone 16 when the cell phone 16, for example, is turned on. When the cell phone 16 is turned on, the state-reporting module 44 of the VOIP phone 44 detects the new state information. The new state information is then relayed to the multi-camp-on module 52, which then initiates a phone call to the cell phone 16 or performs another desired action based on predetermined rules established by a user of the VOIP phone 12 via the user interface 48.

In the present specific embodiment, the multi-camp-on module 52 provides a user option, via the user interface 48, to choose what states to camp-on for different devices, such as the cell phone 16 and/or the landline phone 32. Available camp-on states, i.e., camp-on information from which a user may choose, may be determined via the state-reporting module 44. The state-reporting module 44, which may selectively query the central server 34 to determine what state information is available for a particular phone number, i.e. communications device associated with the phone number and/or address. The choice of what state or states to camp-on is incorporated within the camp-on rules associated with a given camp-on setup.

In the present scenario, before the state of the cell phone 16 has sufficiently changed to trigger a call back by the VOIP phone 12 or other action, the user of the VOIP phone 12 calls the landline phone 32. However, calls to the landline phone 32 are currently being forwarded and/or the landline phone 32 is busy as indicated by state information in the centralized device-state repository 38 with reference to the state module 42 at the circuit switch 28. Accordingly, the user of the VOIP phone 12 then employs the user-interface 48 to establish another camp-on setup that is concurrent with the camp-on setup pertaining to the cell phone 16.

As an example, the landline camp-on setup may include the phone number associated with the landline phone 32, current or recent state information pertaining to the state of the landline phone 32, and user-adjustable camp-on rules. The user-adjustable camp-on rules may instruct, for example, that the VOIP phone 12 call the landline phone 32 when the landline phone 32 is no longer in a call-forward state, i.e., when calls to the landline phone 32 are no longer being forward elsewhere and when the landline phone 32 is no longer busy.

The user of the VOIP phone 12 may set up multiple camp-on setups, which are tracked and maintained via the multicamp-on module 52. To activate a desired user interface application and series of screens displayed via the user interface 48 to facilitate establishing camp-on setups, a user may press the camp-on button 50. Multiple camp-on functionality may be omitted from the network 10 without departing from the scope of the present invention.

The camp-on button 50 may be a softkey pertaining to one or more camped-on lists. Activation of the camp-on button 50 may activate a list of all camp-on setups that the user of the VOIP phone 12 has entered. Camp-on setups may be deleted from or added to the list by a user via the user interface 48. Such functionality may be readily implemented in the VOIP phone 12 by those skilled in the art with access to the present teachings without undue experimentation.

The state-tracking module 46 maintains information pertaining to the current state of the VOIP phone 12. This state information may be employed by the user to facilitate establishing one or more camp-on rules and/or criteria. For example, a user may specify that the VOIP phone 12 only call back a user that is being camped on if the VOIP phone 12 is in a certain state, such as if the VOIP phone 12 is not currently being used for another purpose as specified by state information related by the state-reporting module 44 to the multi-camp-on module 52 from the state-tracking module 46.

As another example, given user-specified camp-on rules, which may be established by a user of the VOIP phone 12, may specify that the VOIP phone 12 only call back the cell phone 16 when the cell phone 12 is not currently being used to send a text message; when the battery power of the cell phone 16 is at full strength, and so on, or combinations of conditions thereof. The ability of a user to set camp-on rules based on device state information that has been selectively propagated through the network 10 represents beneficial functionality that greatly enhances the versatility of the network 10 by affording users of devices connected to the network 10 additional communication options and capabilities.

One or more protocols and/or messaging types, such as Internet Protocol (IP), Session Initiation Protocol (SIP), eXtensible Markup Language (XML) messages, and so on, may be employed by modules of the system 10 to facilitate propagating state information through the system 10.

The call manager 34 of the central server 14 may be configured to automatically propagate state information as needed to communications devices, such as the VOIP phone 12 when the communications devices attempt to initiate phone calls or at other times as needed for a particular implementation.

In the present specific embodiment, the soft switch 36 running on the call manager 34 facilitates translating between telephone numbers that identify phones connected to the PSTN 30 and IP addresses and phone numbers that identify devices, such as the VOIP phone 12, that are connected to the packet-switched network 16. The soft switch 36 facilitates establishing an initial communications session between the VOIP phone 12, the pack-switched network 16, and the landline phone 32 via the PSTN 30 and between the VOIP phone 12, the packet-switched network 16, and the cell phone 16 via the cellular network 24. After the communication session is established, communications between the VOIP phone 12 and the other phones 16, 32 may occur through the packet-switched network 16 without being routed through the soft switch 36.

In an alternative operative scenario, the central camp-on module 40 continuously monitors states of communications devices, such as the cell phone 16 and the landline phone 32 that are being camped on and forwards information to the caller device, i.e., the VOIP phone 12 when one or more states of the callee devices 16, 32 change. Camp-on setup information may be forwarded from the VOIP phone 12 to the central camp-on module 40 to facilitate centralized camp-on state tracking via the central camp-on module 40.

Those skilled in the art with access to the present teachings may readily implement various modules discussed in the present embodiment without undue experimentation. Various modules discussed herein may be implemented in hardware and/or software. The hardware and/or software may be centralized or distributed among entities connected to the network 10. Furthermore, some of the devices and modules shown in FIG. 1 may be implemented via few or no modifications to existing devices and/or modules. For example, the cell phone 16 may be implemented via conventional cell phone. The MSC 20, the MSM 18, and the cell-phone state module 22 may be implemented via few modifications to existing cellular network infrastructure without departing from the scope of the present invention. For example, one skilled in the art may readily configure an MSC, such as the MSC 20, to relay state information to another network entity, such as the central server 14, in response to a query. Note that cellular networks already maintain certain state information. As network technologies and components advance, additional state information will become available. Embodiments of the present invention may be employed to effectively leverage this state information to greatly enhance user options and communications versatility.

Hence, the system 10 of FIG. 1 may employ a centralized network node, such as the central server 14, to maintain state information pertaining to connected devices 12, 16, 32. The system 10 then selectively proliferates the state information to facilitate enhanced network functionality, particularly enhanced camp-on features.

Figure 2:
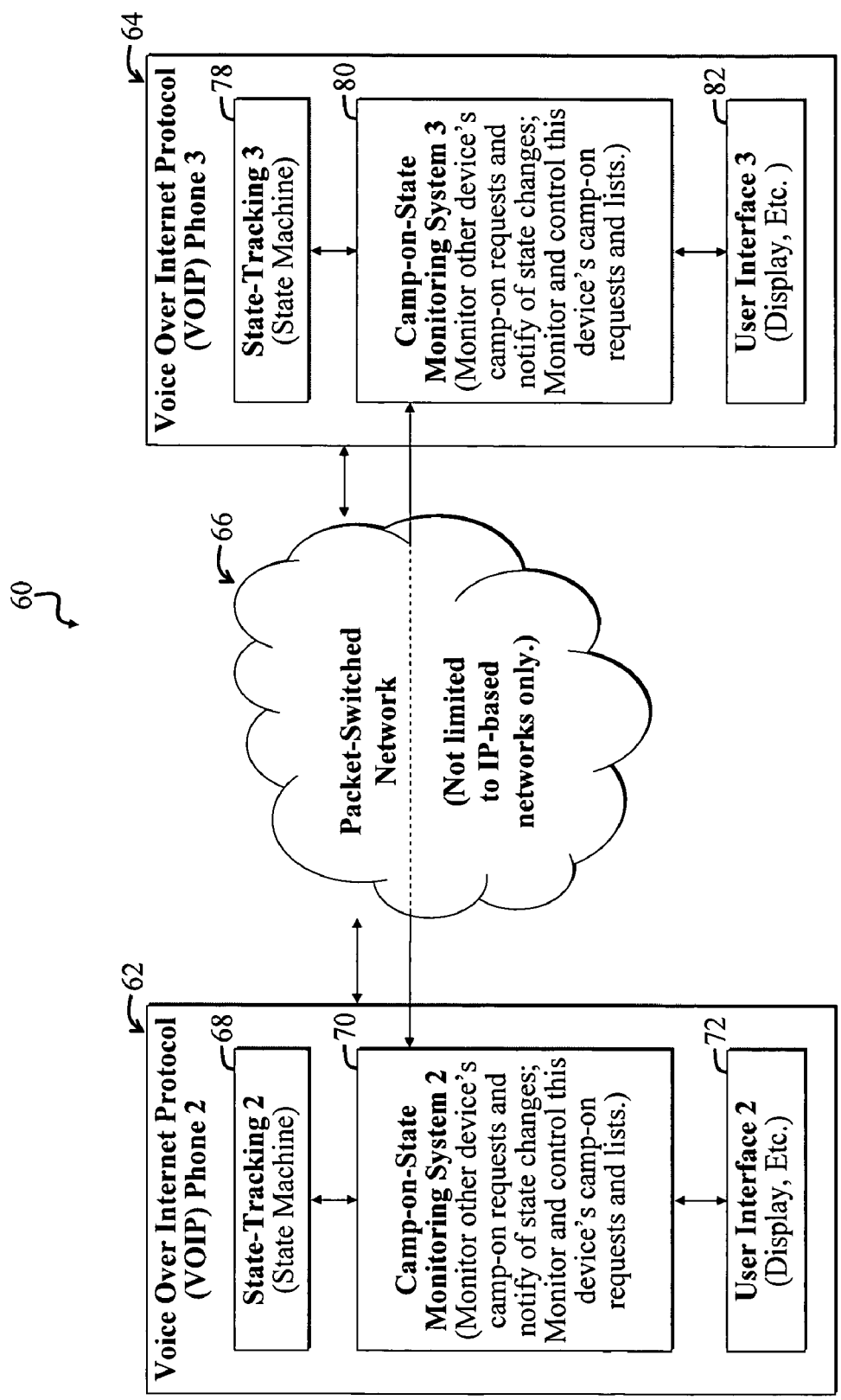
FIG. 2 is a diagram of a first alternative embodiment of the system of FIG. 1 that is adapted for use between two VOIP phones.

FIG. 2 is a diagram of a first alternative embodiment 60 of the system 10 of FIG. 1 that is adapted for use between two VOIP phones 62, 64. The system 60 represents a distributed implementation, wherein modules on endpoints 62, 64 are employed to monitor state information and provide signals in response to changes in state information as discussed more fully below.

The embodiment 60 is an enhanced network that includes a PSTN 66 to which are connected a second VOIP phone 62 and a third VOIP phone 64. The first VOIP phone 62 includes a state machine 68 in communication with a camp-on-state monitoring system 70. The camp-on-state monitoring system 70 communicates with an accompanying user interface 72.

The third VOIP phone 64 is similar to the second VOIP phone 62, with a third state machine 78, a third camp-on-state monitoring system 80, and a third user interface 82, which correspond to the modules 68, 70, 72, respectively of the second VOIP phone 62, respectively.

In operation, the camp-on-state monitoring system 70 includes software and/or hardware instructions, such as routines for enhancing camp-on functionality. The instructions include one or more routines for monitoring camp-on requests, setups, and/or associated rules from another phone, such as the third VOIP phone 64 that originated the camp-on requests, setups, and/or rules. The routines monitor the state of the current VOIP phone 62 with reference to the state machine 68 and selectively forward information, via the packet-switched network 66, pertaining to relevant state changes to the third phone 64 that originated the camp-on request. The third phone 64 then selectively acts on the state change information, such as by initiating a call to the second VOIP phone 62 in response to the state change information and based on predetermined camp-on rules, which may be configured via the third user interface 82.

In the present specific embodiment, additional instructions implemented via the second camp-on-state monitoring system 70 monitor the state of camp-on requests, setups, and/or rules configured via a user of the second VOIP phone 62. For the purposes of the present discussion, camp-on requests may include camp-setup information, such as phone number information, and camp-on rules specifying what actions to take in response to a given state condition.

These additional instructions selectively forward camp-on requests to the third camp-on-state monitoring system 80 of the third VOIP phone 64. The selective forwarding of camp-on request information may occur in response to a camp-on setup being configured via the user interface 72 of the second VOIP phone 62. A camp-on setup may be pre-configured. Alternatively, the camp-on setup may occur, for example, in response to an initial attempt by the second VOIP phone 62 to call the third VOIP phone 64.

The camp-on state monitoring module 70 may be user configured to only advertise, i.e., provide information pertaining certain states of the VOIP phone 62 to other phones, such as the third VOIP phone 64. For example, a user may not wish to advertise state information pertaining to battery power levels of the first VOIP phone 62. In this case, the user may prevent this state information from being provided to the camp-on-state monitoring system 70 by employing the user interface 72 to adjust one or more routines running on the camp-on-state monitoring system 70 accordingly.

While the operation of the present system 60 had been discussed with respect to one phone being the caller phone and the other phone being the callee phone, caller phone and the callee phone may be switched, so that the caller phone is the callee phone and the callee phone is the caller phone, without departing from the scope of the present invention.

Exact details pertaining to the functionality provided by the various modules, such as the camp-on-state monitoring modules 70, 80 of the VOIP phones 62, 64 are application specific. Those skilled in the art may readily implement additional or fewer features to meet the needs of a given application without departing from the scope of the present invention.

While embodiments herein are discussed with reference to camp-on setups that have been configured by a user, embodiments of the present invention are not limited thereto. For example, default camp-on setups may be employed without departing from the cope of the present invention.

To facilitate exchanging state information between the VOIP phones to enable camp-on of desired states of each phone 62, 64, various protocols and message types may be suitable. For example, Session Initiation Protocol (SIP) history and reason codes may be employed to transfer state information between the VOIP phones 62, 64 over the packet-switched network 66.

The system 60 may be considered a system for enhancing functionality of a communications device that includes a first communications device 62; a first request-tracking module 70 in communication with the first communication device 62; a second communications device 64; a second state-tracking module 80 in communication with the second communication device 64 and adapted to track one or more states thereof and further in communication with the first request-tracking module 70; and a state-monitoring module 78 in communication with the first request-tracking module 70, such as via the packet-switched network 66.

The second state-monitoring module 78 is adapted to send a signal to the first communication device 62 when a state of the second communication device 64 changes. The first request-tracking module 70 issues a request to the second state-tracking module to notify the first communication device 62 when the state changes. The one or more states may include one or more of the following: a call-forwarding state, a Do-Not-Disturb (DND) state, out-of-range state, an unavailable state, and so on.

With reference to FIG. 1, the second state-tracking module 80 may be implemented via plural modules, such as the cell phone state module 22, the centralized device-state repository 38, and the central camp-on module 40 of FIG. 1. Hence, the second state tracking module may include a module 22, 38, 40 residing in one or more of the following: a call manager 34, a Mobile Switching Center (MSC) 20, a Mobile Station Manager (MSM) 18.

With reference to FIG. 2, the system 60 may include a first mechanism 70 in the first communications device 62 for initiating a call between the first communications device 62 and the second communications device 64 in response to a state change detected by the second state-tracking module 80. A second mechanism 66, 80, 70 may selectively proliferate device state information in response to one or more requests initiated the first communications device 62 and received by the first request-tracking module 70 to monitor states of the second communications device 64.

Figure 3:
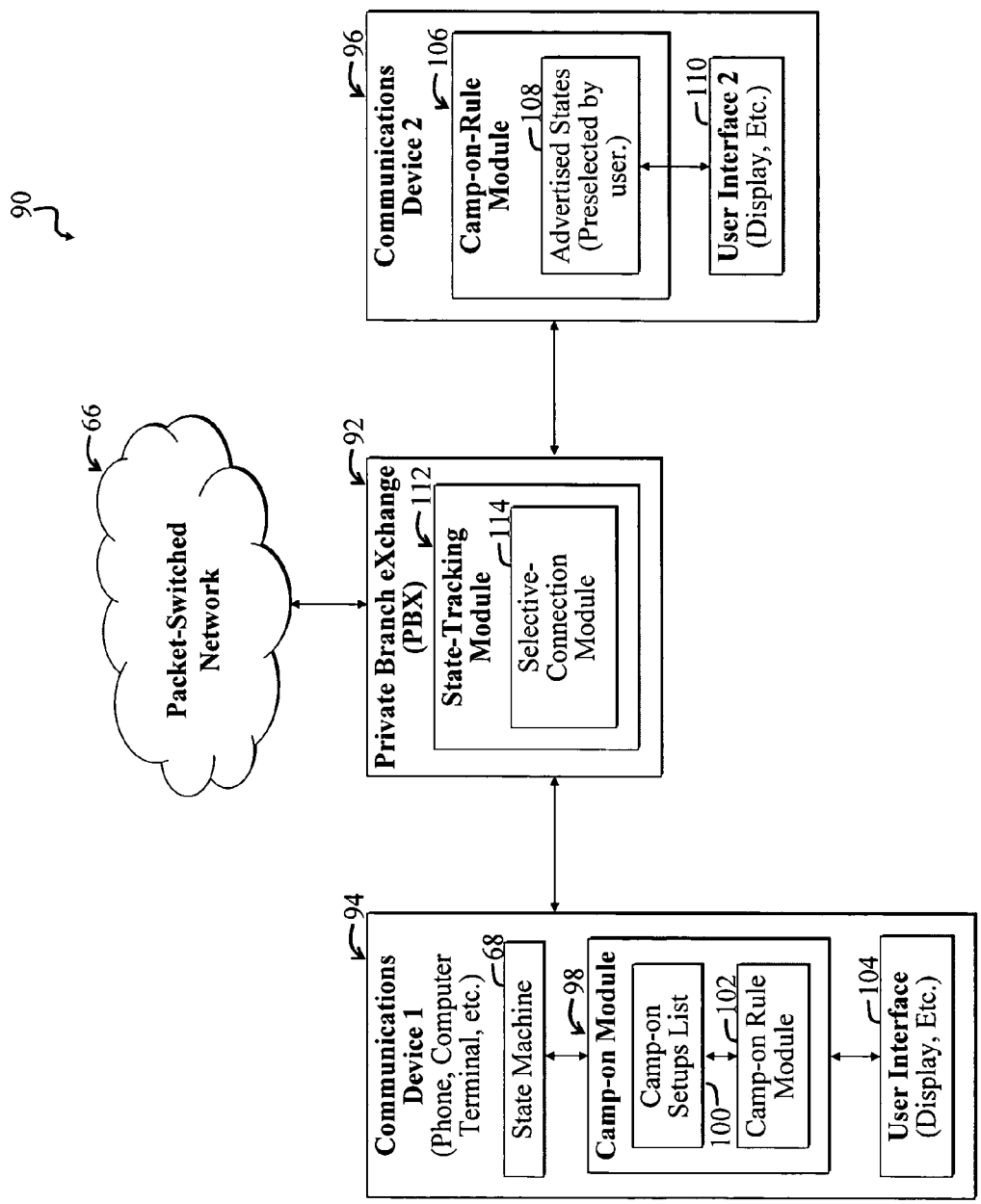
FIG. 3 is a diagram illustrating a second alternative embodiment of the system of FIG. 1 that employs a Private Branch exchange (PBX).

FIG. 3 is a diagram illustrating a second alternative embodiment 90 of the system 10 of FIG. 1 that employs a Private Branch exchange (PBX) 92. For the purposes of the present discussion, a PBX may be a private phone system that facilitates connecting parties in a local phone network, such as a Small Office/Home Office (SOHO) business phone network. A PBX may be connected to an outside phone network, such as the PSTN 66.

The enhanced network 92 includes a first communication device 94 in communication with a second communication device 96 via the PBX 92. The first communication device 94, which may be implemented via a VOIP phone, a computer, or other device, includes a camp-on module 98 in communication with a first user interface 104. The camp-on module 98 includes a camp-on setups module 100, which includes a camp-on rule module 102. The camp-on rule module 102 maintains user-configurable rules for acting in response to a state change or condition pertaining to another network entity, such as the second communications device 96.

In the present specific embodiment, the second communications device 96 includes a second camp-on rule module 106 that communicates with a second user interface 110. The second camp-on rule module 106 includes an advertised-states module 108, which maintains information specifying what states, such as busy state, forwarding state, and so on will be advertised by the second communications device 96.

The PBX includes a PBX state-tracking module 112, which includes a selective-connection module 114. The selective-connection module 114 includes one or more routines for selectively sending messages or establishing calls between the communications devices 94, 96 in response to one or more predetermined conditions based on state information associated with one or more of the communications devices 94, 96.

In one operative scenario, the first communications device 94 is employed to camp-on and advertised state of the second communications device 96. The advertised state may be selectively forwarded to and/or retrieved b the state-tracking module 112 running on the PBX system 92. The first communications device 94 may initiate a camp-on based on one or more of the states of the second communications device 96 that are advertised via the state-tracking module 112. To initiate a camp-on, camp-on setup information is forwarded from the first communications device to the state-tracking module 112. The camp-on-state information may include various types of information, such as phone number or other address, selected state or states to camp-on, and camp-on rules, such as rules specifying certain actions in response to certain state-based criteria.

The state-tracking module 112 then monitors the state of the second communications device 96 and initiates one or more actions in accordance with the camp-on rules when one or more criteria pertaining to one or more advertised states of the second communications device 96 are met. Exemplary actions include connecting the first communications device 94 with the second communications device 96 via a voice call; sending a text message from the first communications device 94 to the second communications device 96; and so on.

The PBX 92 may be replaced with another type of network device or switch, such as a router or Open Systems Interconnect (OSI) layer 3 or layer-2 switch, without departing from the scope of the present invention. In implementations wherein the PBX system 92 includes requisite IP switching functionality and server functionality, email messages, IM messages, and so on may be initiated in response to certain state-based conditions or criteria.

A user may employ the first communications device to perform other types of camp-on operations without departing from the scope of the present invention. For example, multiple camp-on setups may be tracked in the camp-on-setups module 100.

Embodiments of the present invention are not limited to telephone calls, video conferencing, or other multimedia communications. Embodiments of the present may be adapted to work with any type of network communications session without departing from the scope of the present invention.

Various protocols may be employed to facilitate implementing the network 90. For example, SIP history and SIP reason codes can provide, to the state-tracking module 112 and/or the first camp-on module 98, the state of a callee device 96 and the reason for a call diversion, such as whether the callee device 96 is busy, set to a forwarding mode, and so on.

As networks advance and numbers of possible advertised device states grows, the ability to make camp-on decisions based on advertised states, via embodiments of the present invention grows. Advertised state information may not be limited to predetermined device states, such as on, off, busy, and so on. Other types of device state information maybe employed, and such device state information may be customized and configured via various embodiments of the present invention. For example, a user may employ the second user interface 110 of FIG. 3 to specify why the user of the second communications device 96 is unavailable. For example, the user may be on vacation, in a conference, and so on. Such states may be characterized by user-supplied descriptions that may be forwarded back to the user of the first communications device 94 to facilitate selecting desired camp-on rules based on the description of the current state of the second communications device 96.

Hence, the system 90 of FIG. 3 may be considered a system for enabling a camp-on feature for a communications device that includes a first mechanism 108, 112 for providing information pertaining to why a given user of a first communications device 94, i.e., the callee device, is unable to be contacted or a call cannot otherwise be answered. A second mechanism 100, 102, 104 enables a user of a second communications device 94, i.e., the caller device, to make a camp-on decision based on the information. The information includes state information pertaining to the first communications device 96.

SIP may be employed to provide reason information, i.e., state information, to the caller device 94, pertaining to why the call cannot be answered by the callee device 96. The reason information may include information indicating that the callee device 96 is connected to another call or is otherwise not immediately available. The reason information may further include information indicating why the user of the callee device is not available.

The system 90 may also be considered a system for enhancing functionality of a communications device that includes a first mechanism 98, 112, 106 for selectively proliferating state information in a network 90, yielding proliferated state information in response thereto. The proliferated state information may correspond to state information maintained in the state-tracking module 112 and/or state information about the callee device 96 that is forwarded to the camp-on module 98 of the caller device 94 via the state-tracking module 112 and the advertised-states module 108.

A second mechanism 98, 104 a device, such as the caller device 94, which is connected to the network 90, to provide a user option to employ the state information to selectively automatically initiate a desired action via the device 94 based on the proliferated state information.

Figure 4:
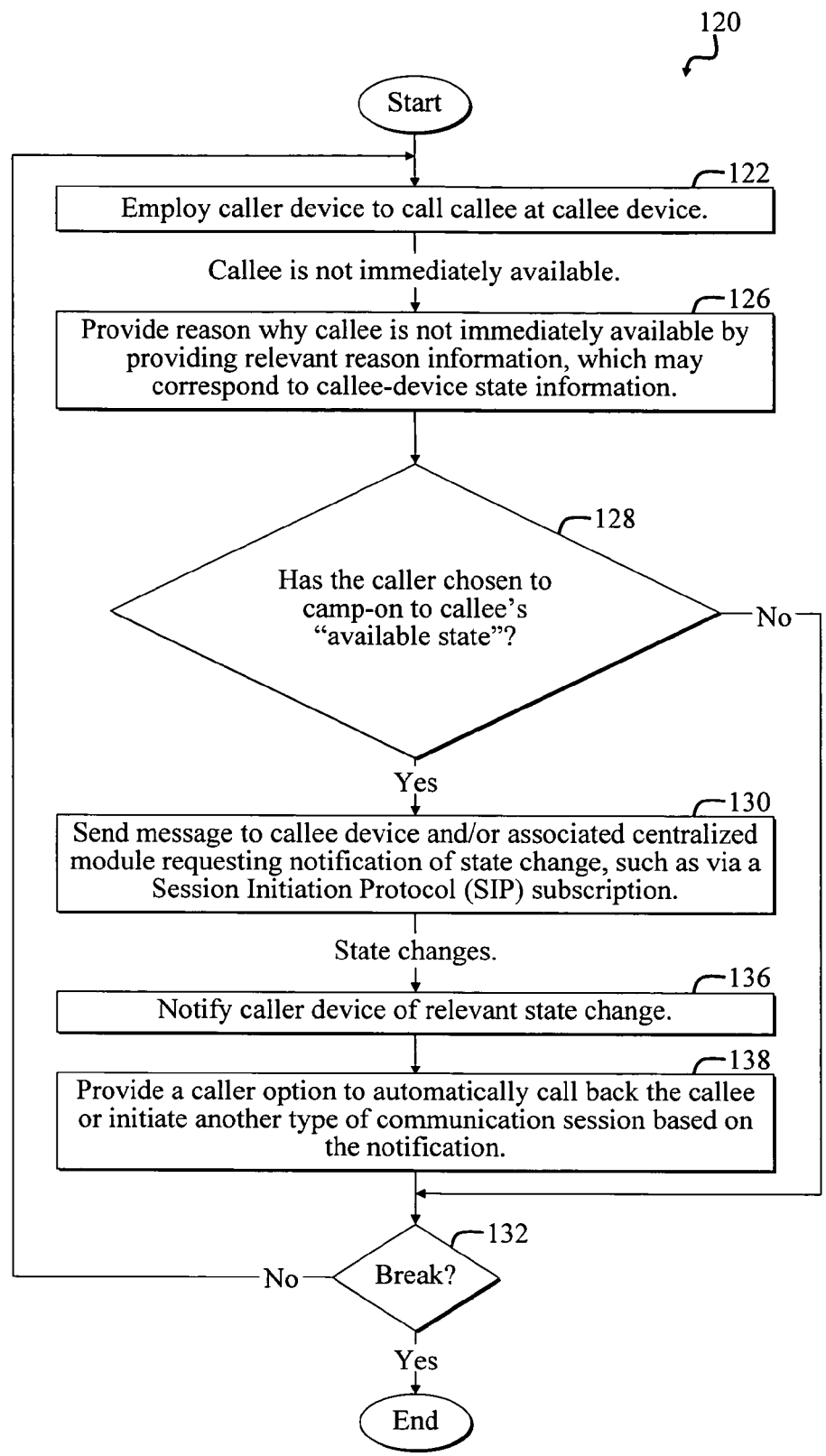
FIG. 4 is a flow diagram of a method adapted for use with the systems of FIGS. 1-3.

FIG. 4 is a flow diagram of a method 120 adapted for use with the systems 10, 60, 90 of FIGS. 1-3. The method 120 includes initial calling step 122, wherein a caller employs a caller device to call a callee employing a callee device. In cases wherein the caller is not available or the callee device is characterized by a certain predetermined state, such as a busy state, a call-forwarding state, a DND state, and so on, a subsequent state-relaying step 126 is performed.

The state-relaying step 126 includes relaying state information, such as via one or more SIP reason codes, indicating a reason why the callee cannot directly be reached by the caller via the callee communications device. Alternatively, the state information lacks any reason why the callee cannot be directly reached, but indicates other state information with which the caller may employee the caller device to make a camp-on decision or decision to perform another type of action. For example, the caller device may determine that the callee device is in a cellular coverage area that lacks strong signal coverage before the caller device makes a call connection to the callee device. The caller may then decide to wait until the callee device enters a region with stronger signal coverage. Signal coverage information may represent state information that the caller device may be configured to automatically retrieve before connecting with a cellular callee device.

Subsequently, a camp-on checking step 128 determines if one or more camp-on options and/or setups are provided by the caller and/or caller device. For example, the caller may choose to camp-on to the signal-strength state of a cellular callee device. The camp-on setup may indicate a desired action to be performed in response to a predetermined condition or change in condition of the caller device. If the camp-on checking step 128 determines that a camp-on option has not been provided, then a break-checking step 132 is performed.

The break-checking step 132 determines if a system break has occurred. A system break may occur when the caller device is turned off, or the caller decides to disable or not use camp-on functionality offered by embodiments of the present invention. If a system-break has occurred, the method 120 completes. Otherwise, the method 120 continues at the initial calling step 122.

If a camp-on option is provided by the caller and/or by a caller device, in a camp-on providing step 128, then a first message-sending step 130 is performed. The first message-sending step 130 involves sending a message to the callee device and/or associated central call manager, which communicates with the callee device, requesting to be notified in when the callee device and/or caller are associated with specified state change or state condition. The callee device may determine available state information. The state information may be selectively advertised by the callee device, such as by sending the requisite state information to the caller device directly or by forwarding the state information to one or more centralized repositories of state information. The transfer of state information may occur in response to a SIP subscription to the advertised state information, wherein the SIP subscription is initiated by the caller device via a camp-on setup.

When a change in state of the callee device is detected, a notifying step 136 is performed. The notifying step 136 involves notifying the caller device, such as directly via the callee device or via a centralized device, of any or all relevant state changes associated with the callee device.

Subsequently, an option-providing step 138 is performed. The option-providing step 138 involves providing any additional options to the caller to enable the caller to make any further camp-on decisions if the initial camp-on setup calls for such or otherwise lacks requisite information. For example, when the state of the callee device changes, the caller device may be notified that the state has changed and then be provided with an option to automatically call back the callee or initiate another type of action, such as initiating another type of communication session. After the desired action is performed, the break-checking step 132 is performed.

Various steps 122-138 of the method 120 may be omitted, changed, or reordered without departing from the scope of the present invention. For example, the option-providing step 138 may be omitted, especially in embodiments wherein an initial camp-on setup specifies answers to user options in advance of detection of a state change of the callee device. As another example, the method 120 may be replaced with a more generalized method without departing from the scope of the present invention. An exemplary more generalized method involves providing information pertaining to why a given user of a first communications device is unable to be contacted and then enabling a user of a second communications device to make a camp-on decision based on the information.

Another more generalize method involves selectively proliferating state information in a network, yielding proliferated state information in response thereto and then employing a device connected to the network to provide a user option to employ the state information to selectively automatically initiate a desired action via the device based on the proliferated state information.

Another generalized method involves monitoring a state of a first communications device connected to a network; selectively providing the state information or an indication thereof to a second communications device connected to the communications network; and then enabling the second communications device to initiate a communication action based on the state information or indication thereof.

Another generalized a method involves employing a first device to determine when a second device connected to the network is not available; determining a reason why the second device is not available based on a state of the second device; monitoring the state of the second device selectively providing a signal in response thereto when the state changes; and then employing the first device to selectively send a message to the first device based on the signal.

Hence, with reference to FIGS. 1-4, the systems 10, 60, 90 and method 120 provide a way to employ state information to facilitate improving network functionality. implement highly adaptable conferences to meet the needs of a given application. Note that various embodiments may be adapted to work with various types of networks, either wired or wireless, Local Area Networks (LANs), Wide LANs (WLANs), the Internet, and so on.

While the present embodiment is discussed with reference to systems and methods for enhancing camp-on functionality for phone calls, embodiments of the present invention are not limited thereto. For example, communications sessions other than phone calls, such as emails, IM sessions, and so on may benefit from camp-on functionality and/or state-proliferation functionality afforded by embodiments of the present invention.

Although embodiments of the invention are discussed primarily with respect to specific network architectures, any acceptable architecture, topology, protocols, or other network and digital processing features can be employed. Any type of communication system, mode or endpoint device may be used with features of the invention. For example, although the invention has been discussed with respect to standard telephone, cellular and VOIP calls, other suitable (including future) communication modes can be used such as radio communications (e.g., "walkie talkie"), intercom, etc. In general, network controllers, managers, endpoints, and so on, can be implemented via any device with processing ability or other requisite functionality.

Although processes of the present invention and the hardware executing the processes may be characterized by language common to a discussion of the Internet (e.g., "client," "server," "peer"), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing device can be used as a client. For example, portable computing devices such as a personal digital assistant (PDA), cell phone, laptop computer, or other devices can be employed. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at simultaneously. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, propagation medium, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", an and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. An apparatus for camping on a call, the apparatus comprising:
   a processor; and
   a memory coupled to the processor comprising instructions for execution by the processor, the processor being operable when executing the instructions to:

set an advertised state of a first communication device in response to input from a user associated with the first communication device, wherein the advertised state is specified by the user;

determine the advertised state of the first communication device in response to a caller attempting to call the first communication device from a second communication device;

present the advertised state of the first communication device for communication to the caller;

set a camp on the call to the first communication device in response to input from the caller indicating a desire to camp on the call to the first communication device and based on one or more of a first plurality of caller-selected camp-on options, wherein at least one option of the first plurality of caller-selected camp-on options is associated with a signal-strength state of the first communication device;

determine a change in the advertised state of the first communication device; and provide the caller with a second plurality of caller-selected camp-on options that are based on the change in the advertised state.

2. The apparatus of claim 1, wherein the processor is further operable when executing the instructions to automatically accept a connection to the first communication device in response to the change in the advertised state of the first communication device.

3. The apparatus of claim 1, wherein the processor is further operable when executing the instructions to accept a connection to the first communication device in response to input from the caller indicating a desire to accept the connection.

4. The apparatus of claim 1, wherein the advertised state indicates that the user associated with the first communication device is currently busy.

5. The apparatus of claim 1, wherein the advertised state indicates that the user associated with the first communication device currently wants calls to the first communication device forwarded to a third communication device.

6. The apparatus of claim 1, wherein the advertised state indicates that the user associated with the first communication device currently wants calls to the first communication device forwarded to a voice-mail system.

7. A method for camping on a call, the method comprising:

setting an advertised state of a first communication device in response to input from a user associated with the first communication device, wherein the advertised state is specified by the user;

determining the advertised state of the first communication device in response to a caller attempting to call the first communication device from a second communication device;

presenting the advertised state of the first communication device for communication to the caller;

setting a camp on the call to the first communication device in response to input from the caller indicating a desire to camp on the call to the first communication device and based on one or more of a first plurality of caller-selected camp-on options, wherein at least one option of the first plurality of caller-selected camp-on options is associated with a signal-strength state of the first communication device;

determining a change in the advertised state of the first communication device; and providing the caller with a second plurality of caller-selected camp-on options that are based on the change in the advertised state.

8. The method of claim 7, further comprising presenting the change in the advertised state of the first communication device for communication to the caller.

9. The method of claim 7, further comprising automatically accepting a connection to the first communication device in response to the change in the advertised state of the first communication device.

10. The method of claim 7, further comprising accepting a connection to the first communication device in response to input from the caller indicating a desire to accept the connection.

11. The method of claim 7, wherein the advertised state indicates that the user associated with the first communication device is currently busy.

12. The method of claim 7, wherein the advertised state indicates that the user associated with the first communication device currently wants calls to the first communication device forwarded to a third communication device.

13. The method of claim 7, wherein the advertised state indicates that the user associated with the first communication device currently wants calls to the first communication device forwarded to a voice-mail system.

14. An apparatus for camping on a call, the apparatus comprising:

a processor; and a memory coupled to the processor comprising instructions for execution by the processor, the processor being operable when executing the instructions to:

detect an attempt by a caller at a first communication device to call a second communication device;

prevent connection of the call to the second communication device;

set an advertised state of the second communication device in response to input from a user associated with the second communication device, wherein the advertised state is specified by the user;

present the advertised state of the second communication device for communication to the first communication device;

receive a selection based on one or more of a first plurality of caller-selected camp-on options, wherein at least one option of the first plurality of caller-selected camp-on options is associated with a signal-strength state of the first communication device;

set a camp on the call to the second communication device in response to the selection;

determine a change in the advertised state of the second communication device; and provide the caller with a second plurality of caller-selected camp-on options that are based on the change in the advertised state.

15. The apparatus of claim 14, wherein the advertised state indicates that the user associated with the second communication device is currently busy.

16. The apparatus of claim 14, wherein the advertised state indicates that the user associated with the second communication device currently wants calls to the second communication device forwarded to a third communication device.

17. A method for camping on a call, the method comprising:

detecting an attempt by a caller at a first communication device to call a second communication device;

preventing connection of the call to the second communication device;

set an advertised state of the second communication device in response to input from a user associated with the second communication device, wherein the advertised state is specified by the user;

presenting the advertised state of the second communication device based on one or more for communication to the first communication device;

receiving a selection based on one or more of a first plurality of caller-selected camp-on options, wherein at least one option of the first plurality of caller-selected camp-on options is associated with a signal-strength state of the first communication device;

setting a camp on the call to the second communication device in response to the selection;

determining a change in the advertised state of the second communication device; and providing the caller with a second plurality of caller-selected camp-on options that are based on the change in the advertised state.

18. The method of claim 17, wherein the advertised state indicates that the user associated with the second communication device is currently busy.

19. The method of claim 17, wherein the advertised state indicates that the user associated with the second communication device currently wants calls to the second communication device forwarded to a third communication device.

20. The method of claim 17, wherein the advertised state indicates that the user associated with the second communication device currently wants calls to the second communication device forwarded to a voice-mail system.

21. An apparatus for camping on a call, the apparatus comprising:

a processor;

a memory coupled to the processor comprising instructions for execution by the processor, the processor being operable when executing the instructions to:

set an advertised state of a first communication device in response to input from a user associated with the first communication device, wherein the advertised state is specified by the user;

monitor the advertised state of the first communication device;

receive a first selection from a caller associated with a second communication device, the first selection being based on one or more of a first plurality of caller-selected camp-on options, wherein at least one option of the first plurality of caller-selected camp-on options is associated with a signal-strength state of the first communication device;

set a camp on the call to the first communication device in response to the first selection;

determine a change in the advertised state of the first communication device;

notify the second communication device of the change in the advertised state of the first communication device;

provide the caller with a second plurality of caller-selected camp-on options that are based on the change in the advertised state; and provide a connection to the first communication device from the second communication device in response to a second selection, the second selection being based on the second selection plurality of caller-selected camp-on options.

22. The apparatus of claim 21, wherein a private branch exchange (PBX) comprises the processor and the memory.

23. The apparatus of claim 21, wherein an instant message (IM) to the second communication device comprises the notification.

24. The apparatus of claim 21, wherein the processor is further operable when executing the instructions to establish the connection to the first communication device from the second communication device in response to the second communication device accepting the connection.

25. A method for camping on a call, the method comprising:

setting an advertised state of a first communication device in response to input from a user associated with the first communication device, wherein the advertised state is specified by the user;

monitoring the advertised state of the first communication device;

receiving a first selection from a caller associated with a second communication device, the first selection being based on one or more of a first plurality of caller-selected camp-on options, wherein at least one option of the first plurality of caller-selected camp-on options is associated with a signal-strength state of the first communication device;

setting a camp on the call to the first communication device in response to the first selection;

determining a change in the advertised state of the first communication device;

notifying the second communication device of the change in the advertised state of the first communication device;

providing the caller with a second plurality of caller-selected camp-on options that are based on the change in the advertised state; and providing a connection to the first communication device from the second communication device in response to a second selection, the second selection being based on the second plurality of caller-selected camp-on options.

26. The method of claim 25, wherein a private branch exchange (PBX) comprises the processor and the memory.

27. The method of claim 25, wherein an instant message (IM) to the second communication device comprises the notification.

28. The method of claim 25, further comprising establishing the connection to the first communication device from the second communication device in response to the second communication device accepting the connection.

29. A system for camping on a call, the system comprising:

a first communication device operable to detect an attempt by a caller at a second communication device to call the first communication device, prevent connection of the call to the first communication device, set an advertised state of the first communication device in response to input from a user associated with the first communication device, wherein the advertised state is specified by the user, and communicate an indication of the advertised state of the first communication device to the second communication device;

the second communication device, operable to receive the indication of the advertised state of the first communication device, presenting the advertised state of the first communication device for communication to the caller, and set a camp on the call to the first communication device in response to input from the caller indicating a desire to camp on the call to the first communication device and based on one or more of a first plurality of caller-selected camp-on options, wherein at least one option of the first plurality of caller-selected camp-on options is associated with a signal-strength state of the first communication device; and an intermediary communication device between the first and second communication devices operable to monitor the advertised state of the first communication device, determining a change in the advertised state of the first communication device, notify the second communication device of the change in the advertised state of the first communication device, providing the caller with a second plurality of caller-selected camp-on options that are based on the change in the advertised state, and provide a connection to the first communication device from the second communication device in response to a second selection, the second selection being based on the second plurality of caller-selected camp-on options.

30. The system of claim 29, wherein the intermediary communication device is a private branch exchange (PBX).

* * * * *

UNITED STATES PATENT AND TRADEMARK OFFICE
CERTIFICATE OF CORRECTION

PATENT NO. : 7,660,405 B2  Page 1 of 1
APPLICATION NO. : 11/378602
DATED : February 9, 2010
INVENTOR(S) : Jain et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 501 days.

Signed and Sealed this

Twenty-eighth Day of December, 2010

David J. Kappos
*Director of the United States Patent and Trademark Office*